US012584875B2

(12) United States Patent
Lee et al.

(10) Patent No.: US 12,584,875 B2
(45) Date of Patent: Mar. 24, 2026

(54) DEVICE AND METHOD FOR INSPECTING WELDED STATE FOR CYLINDRICAL SECONDARY BATTERY

(71) Applicant: LG ENERGY SOLUTION, LTD., Seoul (KR)

(72) Inventors: Jung Hoon Lee, Daejeon (KR); Su Taek Jung, Daejeon (KR); Seok Jin Kim, Daejeon (KR); Ji Hoon Lee, Daejeon (KR); Sang Hyun Koo, Daejeon (KR); Min Wook Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 288 days.

(21) Appl. No.: 18/276,611

(22) PCT Filed: Jun. 9, 2022

(86) PCT No.: PCT/KR2022/008139
§ 371 (c)(1),
(2) Date: Aug. 9, 2023

(87) PCT Pub. No.: WO2022/260452
PCT Pub. Date: Dec. 15, 2022

(65) Prior Publication Data
US 2024/0310313 A1 Sep. 19, 2024

(30) Foreign Application Priority Data

Jun. 10, 2021 (KR) ........................ 10-2021-0075666
May 27, 2022 (KR) ........................ 10-2022-0065662

(51) Int. Cl.
*G01N 27/04* (2006.01)
*B23K 31/12* (2006.01)
(Continued)

(52) U.S. Cl.
CPC ......... *G01N 27/041* (2013.01); *B23K 31/125* (2013.01); *H01M 10/4285* (2013.01); *H01M 50/536* (2021.01)

(58) Field of Classification Search
CPC .............. G01N 27/041; H01M 50/536; H01M 10/4285; B23K 31/125
(Continued)

(56) References Cited

U.S. PATENT DOCUMENTS 9,105,911 B2 * 8/2015 Byun .................. H01M 50/522
10,274,448 B2 4/2019 Lupienski et al.
(Continued)

FOREIGN PATENT DOCUMENTS

CN 107344270 A 11/2017
CN 107525951 A 12/2017
(Continued)

OTHER PUBLICATIONS

International Search Report for PCT/KR2022/008139 mailed on Sep. 15, 2022.
(Continued)

*Primary Examiner* — Huy Q Phan
*Assistant Examiner* — Trung Q Nguyen
(74) *Attorney, Agent, or Firm* — Birch, Stewart, Kolasch & Birch, LLP

(57) ABSTRACT

A device for inspecting a welded state of a plurality of welded portions coupling a non-coating portion of an electrode to an electrode tab includes a resistance measurer having a plurality of resistance measurement probes which respectively measure resistance values of the plurality of welded portions; and a resistance inspector which compares each of the resistance values of the plurality of welded portions, with a critical resistance value. When the resistance value of at least one welded portion among the
(Continued)

plurality of welded portions exceeds the critical resistance value, the at least one welded portion is determined as having a weak welding. The plurality of resistance measurement probes respectively measure the resistance values of the plurality of welded portions while being respectively in contact with a non-welding surface disposed between the plurality of welded portions and non-welding surfaces outside outermost welded portions of the plurality of welded portions.

15 Claims, 16 Drawing Sheets

(51) Int. Cl.
*H01M 10/42* (2006.01)
*H01M 50/536* (2021.01)
(58) Field of Classification Search
USPC ............................. 324/500, 600, 76.11, 713
See application file for complete search history.

(56) References Cited

U.S. PATENT DOCUMENTS

| | | | | |
|---|---|---|---|---|
| 10,601,014 | B2 * | 3/2020 | Okada | H01M 50/55 |
| 2008/0131765 | A1 * | 6/2008 | Imanaga | H01M 50/51 |
| | | | | 219/127 |
| 2012/0290228 | A1 | 11/2012 | Lev et al. | |
| 2013/0209849 | A1 * | 8/2013 | Hattori | H01M 50/538 |
| | | | | 429/211 |
| 2017/0322168 | A1 * | 11/2017 | Lupienski | H01M 10/04 |
| 2018/0026252 | A1 * | 1/2018 | Kumazawa | B23K 35/286 |
| | | | | 429/121 |
| 2019/0240788 | A1 | 8/2019 | Park et al. | |
| 2020/0176780 | A1 * | 6/2020 | Mima | H01M 50/536 |
| 2022/0152725 | A1 | 5/2022 | Koo et al. | |

FOREIGN PATENT DOCUMENTS

| | | | |
|---|---|---|---|
| CN | 108181356 | A | 6/2018 |
| CN | 108828061 | A | 11/2018 |
| CN | 109596677 | A | 4/2019 |
| CN | 111323622 | A | 6/2020 |
| CN | 111370637 | A | 7/2020 |
| JP | 2019-60769 | A | 4/2019 |
| KR | 10-2010-0030929 | A | 3/2010 |
| KR | 10-0958038 | B1 | 5/2010 |
| KR | 10-2013-0087101 | A | 8/2013 |
| KR | 10-2014-0077874 | A | 6/2014 |
| KR | 10-2017-0125707 | A | 11/2017 |
| KR | 10-1887148 | B1 | 8/2018 |
| KR | 10-2018-0122115 | A | 11/2018 |
| KR | 10-2019-0050274 | A | 5/2019 |
| KR | 10-2021-0014482 | A | 2/2021 |
| WO | WO 2019/059395 | A1 | 3/2019 |

OTHER PUBLICATIONS

Extended European Search Report for European Application No. 22820579.5, dated Oct. 17, 2024.
Chen, "Welding Procedure Qualification Handbook," Machinery Industry Press, Oct. 1999, 12 pages total.
Xu et al., "Design of Power Battery System," Machinery Industry Press, Dec. 2018, 6 pages total.

* cited by examiner

11a 11a-1

14

15

16

120

SCATTERPLOT OF WELDING STRENGTH [kgf] VS MICRO-RESISTANCE [mΩ]

DEVICE AND METHOD FOR INSPECTING WELDED STATE FOR CYLINDRICAL SECONDARY BATTERY

TECHNICAL FIELD

Cross-Reference to Related Application

The present application claims the benefit of the priority of Korean Patent Application Nos. 10-2021-0075666, filed on Jun. 10, 2021, and 10-2022-0065662, filed on May 27, 2022, which are hereby incorporated by reference in their entirety.

Technical Field

The present invention relates to a device and method for inspecting a welded state for a cylindrical secondary battery, which inspects a welded state between a non-coating portion of an electrode and an electrode tab comprised in the cylindrical secondary battery. In particular, the present invention relates to a device and method for inspecting a welded state for a cylindrical secondary battery, which inspects, through a four-wire resistance measurement method, weak welding on a plurality of welded portions coupling an electrode to an electrode tab.

BACKGROUND ART

In general, secondary batteries refer to batteries that are chargeable and dischargeable unlike non-rechargeable primary batteries, and are widely used in electronic devices such as mobile phones, notebook computers, and camcorders, or electric vehicles, etc. In particular, a lithium secondary battery has a larger capacity and a higher energy density per unit weight than a nickel-cadmium battery or a nickel-hydrogen battery, and thus utilization thereof is on a rapidly increasing trend.

The secondary batteries are classified into a cylindrical secondary battery, in which an electrode assembly is embedded in a metal can, and a pouch type secondary battery in which an electrode assembly is embedded in a pouch. The cylindrical secondary battery comprises an electrode assembly, a can for accommodating the electrode assembly, and a cap assembly mounted in an opening portion of the can. The electrode assembly has a structure in which an electrode and a separator are wound in a jelly-roll shape. The electrode comprises a positive electrode and a negative electrode. The positive electrode is connected to the cap assembly through a positive electrode tab, and the negative electrode is connected to the can through a negative electrode tab.

Here, the negative electrode tab and the positive electrode tab constitute an electrode tab, and the electrode tab is coupled to a non-coating portion of the electrode by welding. Here, a plurality of welded portions are defined in a part in which the electrode tab and the electrode are welded.

However, in the typical secondary batteries, weld defects may occur when the electrode and the electrode tab are weakly welded. Accordingly, after the electrode and the electrode tab are welded, a process for inspecting whether weak welding occurs on the plurality of welded portions is required.

DISCLOSURE OF THE INVENTION

Technical Problem

An object of the present invention for solving the problems is to provide a device and method for inspecting a welded state for a cylindrical secondary battery, which can accurately inspect weak welding on a plurality of welded portions coupling a non-coating portion of an electrode to an electrode tab, and accordingly can improve welding quality.

Technical Solution

The present invention for resolving the above problems is a device for inspecting a welded state for a plurality of welded portions coupling a non-coating portion of an electrode to an electrode tab, the device comprising: a resistance measurer having a plurality of resistance measurement probes which respectively measure resistance values of the plurality of welded portions; and a resistance inspector which compares each of the resistance values of the plurality of welded portions, which are measured by the resistance measurement unit, with a critical resistance value, wherein, when the resistance value of at least one welded portion among the plurality of welded portions exceeds the critical resistance value, the at least one welded portion is determined as having a weak welding. The plurality of resistance measurement probes may respectively measure the resistance values of the plurality of welded portions while being respectively in contact with a non-welding surface disposed between the plurality of welded portions and non-welding surfaces outside outermost welded portions of the plurality of welded portions.

The plurality of resistance measurement probes may be in contact with the non-welding surfaces facing each other with respect to the welded portions.

The non-welding surfaces may be non-welding surfaces of the electrode tab or non-welding surfaces of the non-coating portion, which are disposed at opposite sides of the welded portions, respectively.

The plurality of resistance measurement probes, which are respectively in contact with the non-welding surface disposed between the plurality of welded portions and the non-welding surfaces outside the outermost welded portions, may be spaced apart from each other at the same interval.

The resistance measurement unit may comprise: a seating member configured to support a welding area provided with the plurality of welded portions at which the non-coating portion of the electrode and the electrode tab are coupled to each other; a fixing member disposed at one side of a top surface of the seating member, and the fixing member having a vertical surface and a fixing piece extending from an upper end of the vertical surface; a coupling member disposed on the vertical surface of the fixing member, the coupling member being coupled to the plurality of resistance measurement probes, the coupling member being configured to arrange the plurality of resistance measurement probes to be in simultaneous contact with the non-welding surface disposed between the plurality of welded portions and the non-welding surfaces outside the outermost welded portions; and an elevation member affixed to fixing member, the fixing member being configured to cause the coupling member to descend in a direction of the plurality of welded portions so that the plurality of resistance measurement probes are in simultaneous contact with the non-welding surfaces. Each of the plurality of resistance measurement probes may comprise a current probe and a voltage probe that are paired.

A plurality of coupling holes, into which the plurality of resistance measurement probes are respectively inserted, may be defined in the coupling member, and the coupling holes may penetrate from a top surface to a bottom surface of the coupling member. The resistance measurer may further comprise a plurality of fixing bolts which press-fit and fix the plurality of resistance measurement probes which pass through the coupling member in the plurality of coupling holes, respectively.

The elevation member may be provided as a hydraulic cylinder or a pneumatic cylinder. The resistance measurer may further comprise a switch which supplies a hydraulic pressure or a pneumatic pressure to operate the elevation member.

The device may further comprise: a guide plate having a first end having the coupling member and a second end having a long hole elongated in the vertical direction; and a coupling bolt which passes through the long hole and is fixed to the vertical surface of the fixing member to guide movement of the coupling member in the vertical direction.

The coupling member may be detachable from the guide plate.

A method for inspecting a welded state for a cylindrical secondary battery, comprises: preparing an electrode assembly comprising welded portions coupling a non-coating portion of an electrode to an electrode tab; measuring a resistance value of each of a plurality of welded portions by using a resistance measurer having a plurality of resistance measurement probes; and comparing the resistance values of the plurality of welded portions, which are measured through the resistance measurer, with a critical resistance value, wherein, when the resistance value of at least one welded portion among the plurality of welded portions exceeds the critical resistance value, the at least one welded portion is determined to have a weak welding. In the measuring the resistance value of each of the plurality of welded portions, the plurality of resistance measurement probes may be in contact with a non-welding surface disposed between the plurality of welded portions, and non-welding surfaces outside outermost welded portions of the plurality of welded portions to measure the resistance values of the plurality of welded portions, respectively.

In the measuring the resistance value of each of the plurality of welded portions, the plurality of resistance measurement probes may be in contact with the non-welding surfaces facing each other with respect to the welded portions.

In the measuring the resistance value of each of the plurality of welded portions, the non-welding surfaces may be non-welding surfaces of the electrode tab or non-welding surfaces of the non-coating portion, which are disposed at opposite sides of the welded portions, respectively.

The plurality of resistance measurement probes, which are in contact with the non-welding surface disposed between the plurality of welded portions and the non-welding surfaces outside the outermost welded portions, may be spaced apart from each other at a same interval.

In the measuring the resistance value of each of the plurality of welded portions, the plurality of resistance measurement probes may measure the resistances of the welded portions through a four-wire resistance measurement method.

The critical resistance value may be set to about 0.12 mΩ to about 0.60 mΩ.

Advantageous Effects

The device for inspecting the welded state for the cylindrical secondary battery of the present invention comprises the resistance measurement unit and the resistance inspection unit, and is characterized in that the resistance measurement unit is provided with the resistance measurement probes, which derive the resistance values of the welded portions, and the resistance measurement probes derive the resistance values of the welded portions while being in contact with the non-welding surfaces disposed at the both sides of the welded portions, respectively. Due to such characteristics, the weakly welded state may be accurately measured on the welded portions coupling the non-coating portion of the electrode to the electrode tab, and consequently the welding quality may be improved.

In particular, the device for inspecting the welded state for the cylindrical secondary battery of the present invention is characterized by comprising at least three resistance measurement probes. Due to such a characteristic, the inspection for the weak welding may be performed on each of the plurality of welded portions, and consequently the welding quality may be greatly improved.

MODE FOR CARRYING OUT THE INVENTION

Figure 1:
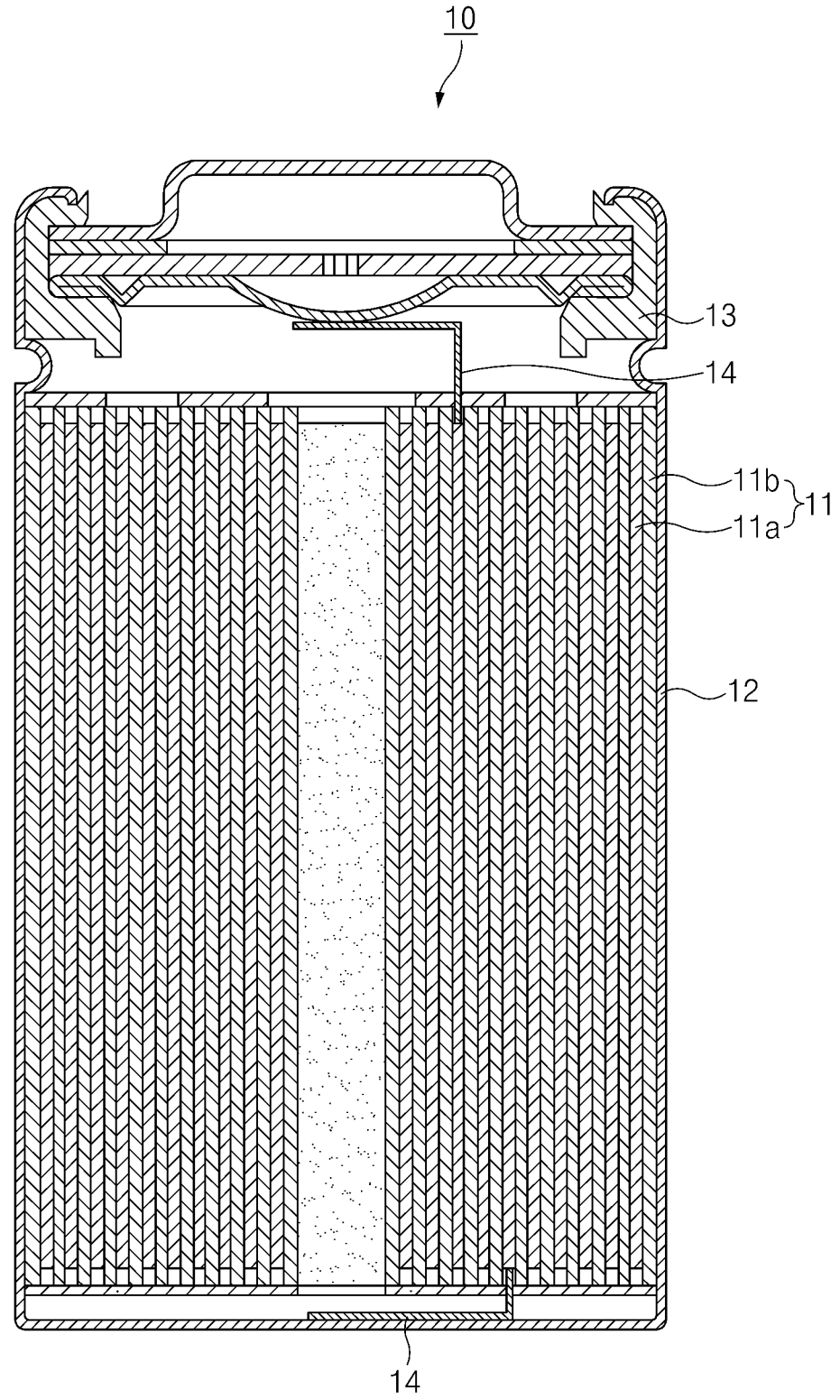
FIG. 1 is a cross-sectional view illustrating a cylindrical secondary battery according to a first embodiment of the present invention.

Hereinafter, embodiments of the present invention will be described in detail with reference to the accompanying drawings to enable those skilled in the art to which the present invention pertains to easily carry out the present invention. The present invention may, however, be embodied in different forms and should not be construed as limited by the embodiments set forth herein. The parts unrelated to the description will be ruled out in order to clearly describe the present invention with reference to the drawings. Like reference numerals refer to like elements throughout the whole specification.

[Cylindrical Secondary Battery According to First Embodiment of Present Invention]

Figure 2:
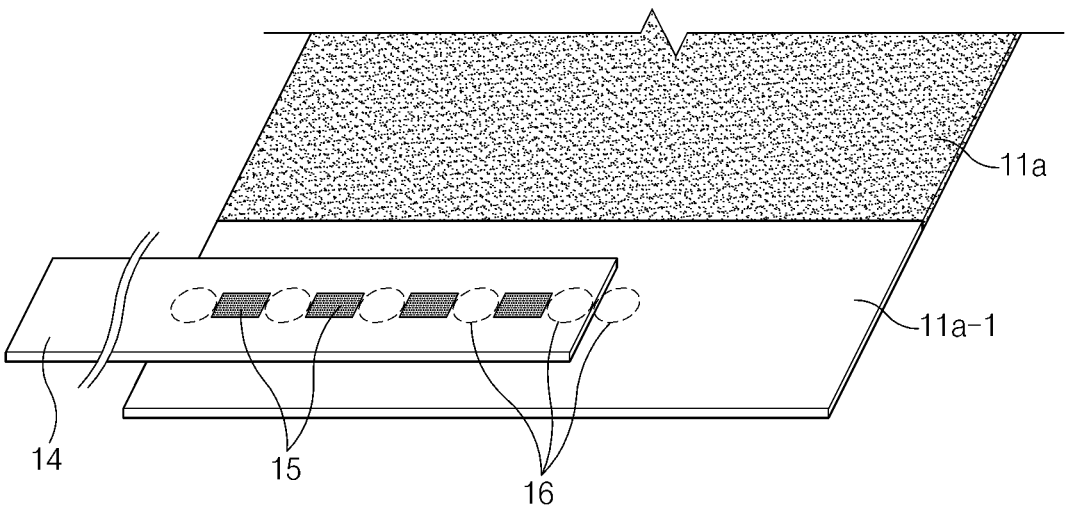
FIG. 2 is a perspective view illustrating welded portions coupling an electrode to an electrode tab of the cylindrical secondary battery according to the first embodiment of the present invention.

As illustrated in FIGS. 1 and 2, a cylindrical secondary battery 10 according to a first embodiment of the present invention comprises an electrode assembly 11, a can 12 in which the electrode assembly is accommodated, and a cap assembly 13 mounted in an opening portion of the can 12. The electrode assembly 11 has a structure in which an electrode 11a and a separator 11b are stacked and wound in a jelly-roll shape. Here, the electrode 11a comprises a positive electrode and a negative electrode.

The positive electrode is connected to the cap assembly 13 through a positive electrode tab, and the negative electrode is connected to the can 12 through a negative electrode tab. The positive electrode tab and the negative electrode tab constitute an electrode tab 14, and the electrode 11a constitutes a non-coating portion 11a-1 devoid of an electrode active material.

In the electrode assembly 11 having such a structure, the non-coating portion 11a-1 of the electrode 11a and the electrode tab 14 are disposed to partially overlap each other, and overlapping areas of the non-coating portion 11a-1 and the electrode tab 14 are coupled to each other by welding. Here, a plurality of welded portions 15, and non-welding surfaces 16 which are not welded, are defined in a welding area of the non-coating portion 11a-1 and the electrode tab 14. The plurality of welded portions 15 are defined so that at least two welded portions, preferably four welded portions, are arranged in a line to increase the coupling force. The non-welding surfaces 16 are defined between the plurality of welded portions 15 and outside the outermost welded portions.

The cylindrical secondary battery 10 having such a structure is inspected for occurrence of weak welding after the electrode 11a and the electrode tab 14 are welded. Here, a device 100 for inspecting a welded state for a cylindrical secondary battery of the present invention is used.

That is, the device 100 for inspecting a welded state for a cylindrical secondary battery of the present invention may accurately inspect welding quality caused by weak welding of the cylindrical secondary battery 10. In particular, the device 100 for inspecting a welded state for a cylindrical secondary battery of the present invention may apply four-wire resistance measurement probes to accurately inspect whether weak welding occurs on the plurality of welded portions 15 comprised in the cylindrical secondary battery 10.

Hereinafter, the device 100 for inspecting a welded state for a cylindrical secondary battery of the present invention will be described in detail with reference to the accompanying drawings.

[Device for Inspecting Welded State for Cylindrical Secondary Battery According to First Embodiment of Present Invention]

As illustrated in FIGS. 3 to 11, a device 100 for inspecting a welded state for a cylindrical secondary battery according to a first embodiment of the present invention is intended to inspect weak welding on the plurality of welded portions 15 coupling the non-coating portion of the electrode 11a to the electrode tab 14.

That is, the device 100 for inspecting a welded state for a cylindrical secondary battery according to the first embodiment of the present invention is characterized in that four-wire resistance measurement probes 112 may be applied to respectively measure resistance values of the plurality of welded portions 15, and the measured resistance values are compared with a critical resistance value to inspect the weak welding.

In particular, the device 100 for inspecting welded state for a cylindrical secondary battery according to the first embodiment of the present invention is characterized in that a plurality of resistance measurement probes 112 are in contact with non-welding surfaces 16 but not with the surfaces of the plurality of welded portions 15. Due to such a characteristic, an accurate inspection for the weak welding may be performed on each of the plurality of welded portions 15 coupling the electrode to the electrode tab 14 of the cylindrical secondary battery 10.

In one example, the device 100 for inspecting a welded state for a cylindrical secondary battery according to the first embodiment of the present invention comprises a resistance measurement unit 110, in which the resistance values of the plurality of welded portions 15 are respectively measured through the plurality of resistance measurement probes 112, and a resistance inspection unit 120, which compares each of the resistance values of the plurality of welded portions 15, which are measured by the resistance measurement unit 110, with the critical resistance value to determine whether weak welding occurs.

Resistance Measurement Unit

The resistance inspection unit 110 is intended to measure the resistance values of the plurality of welded portions 15 through the non-welding surfaces 16 disposed at both sides of the plurality of the welded portions 15, respectively (the surfaces 16 shown in dotted lines at left and right sides of each of the welded portions 15 as seen in FIG. 2).

Here, the resistance inspection unit 110 is capable of measuring resistance of the plurality of welded portions 15 through a four-wire resistance measurement method. When compared to a two-wire resistance measurement method, the four-wire resistance measurement method is not affected by contact resistance, and thus may more precisely measure micro-resistance and may measure the resistance in nano-ohms as well.

That is, the resistance measurement unit 110 comprises a seating member 111, the plurality of resistance measurement probes 112, a coupling member 113, an elevation member 114, and a fixing member 115.

A welding area provided with the plurality of welded portions 15, at which the non-coating portion 11a-1 of the electrode and the electrode tab 14 provided in the electrode assembly of the cylindrical secondary battery are coupled to each other, is seated on the seating member 111. That is, the seating member 111 has a shape of a quadrangular plate and has a top surface on which the welding area having the plurality of welded portions 15 defined therein is disposed.

The plurality of resistance measurement probes 112 are intended to measure the resistance values of the welded portions 15 while being in contact with the non-welding surfaces 16 disposed at both sides of the welded portions 15, respectively.

That is, the plurality of resistance measurement probes 112 respectively measure the resistance values of the plurality of welded portions 15 while being respectively in contact with the non-welding surface 16 disposed between the plurality of welded portions 15 and the non-welding surfaces 16 outside the outermost welded portions 15.

Here, each of the resistance measurement probes 112 comprises a current probe 112a and a voltage probe 112b that are paired. The current probe 112a applies a current to the welded portion 15 that is a measurement target, and the voltage probe 112b measures a voltage. Accordingly, the resistance value is measured through a current value and a voltage value.

Figure 10:
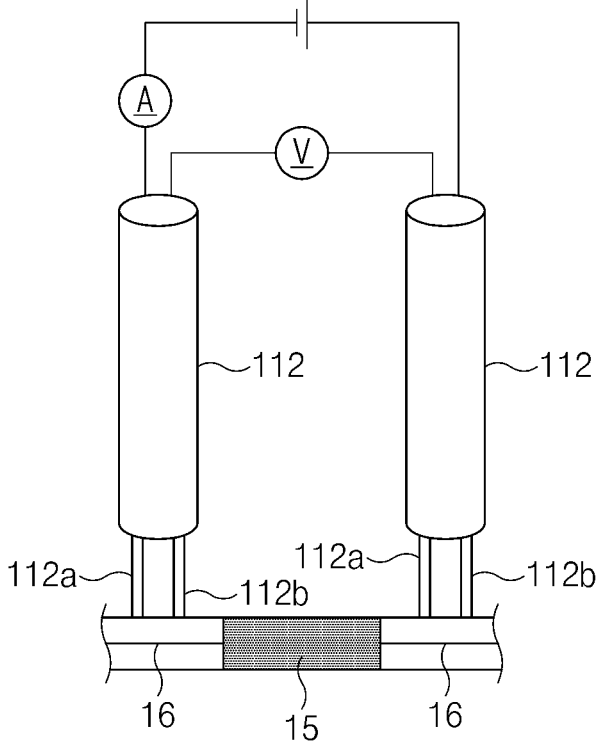
FIG. 10 is a schematic diagram of resistance measurement probes of the device for inspecting a welded state for a cylindrical secondary battery according to the first embodiment of the present invention.

That is, as illustrated in FIG. 10, each of the plurality of resistance measurement probes 112 uses the four-wire resistance measurement method in which a current flows through the current probe 112a in contact with each of the non-welding surfaces 16 at both sides of the welded portion 15, and the other voltage probe measures a voltage (voltage sag) generated according to a flow of the current passing through the welded portion 15. Here, by knowing the measured voltage (V) and streaming current (A), the resistance values may be calculated according to Ohm ($\Omega$)'s law.

The non-welding surfaces non-welding surfaces 16 of the electrode tab 14 or non-welding surfaces 16 provided on the non-coating portion 11a-1 of the electrode 11a. Here, the non-coating portion of the electrode is highly likely to be damaged, and thus the resistance measurement probes may be in contact with the non-welding surfaces 16 of the electrode tab 14.

Figure 6:
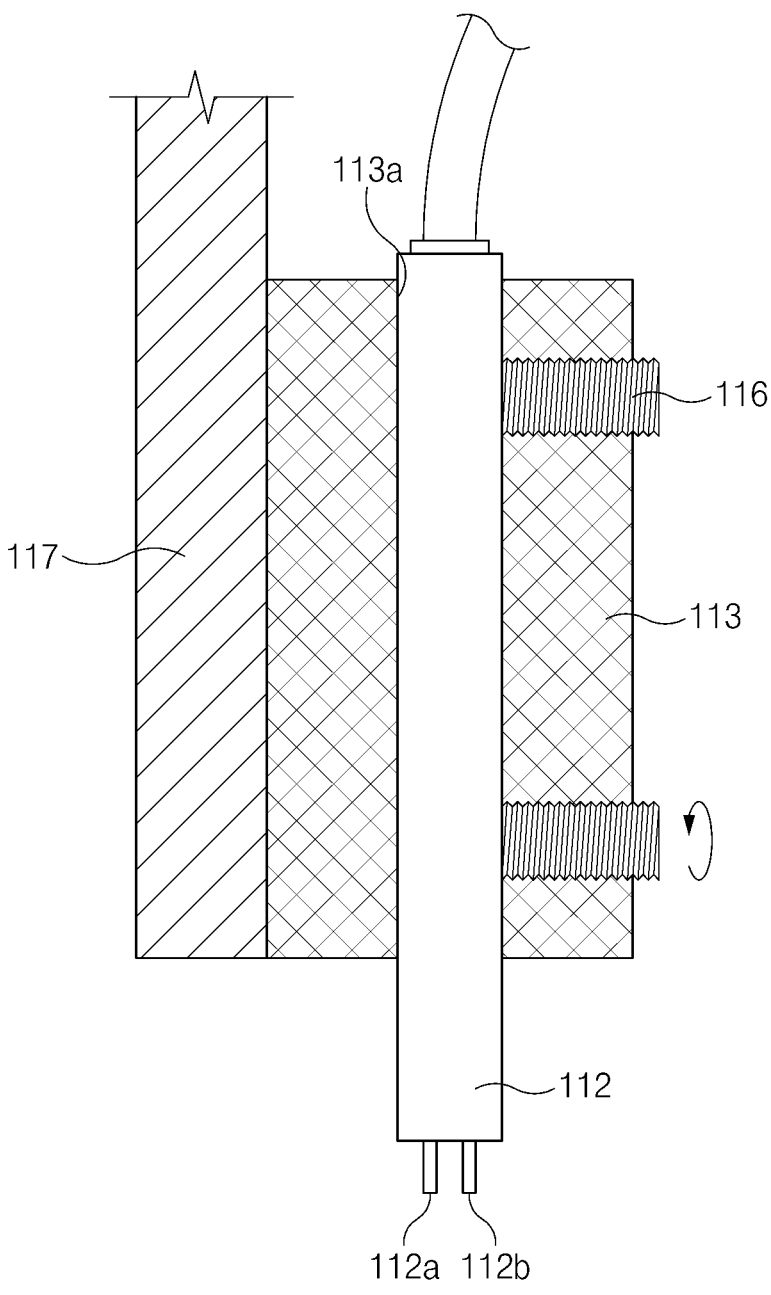
FIG. 6 is a cross-sectional view taken along a line A-A shown in FIG. 5.
Figure 7:
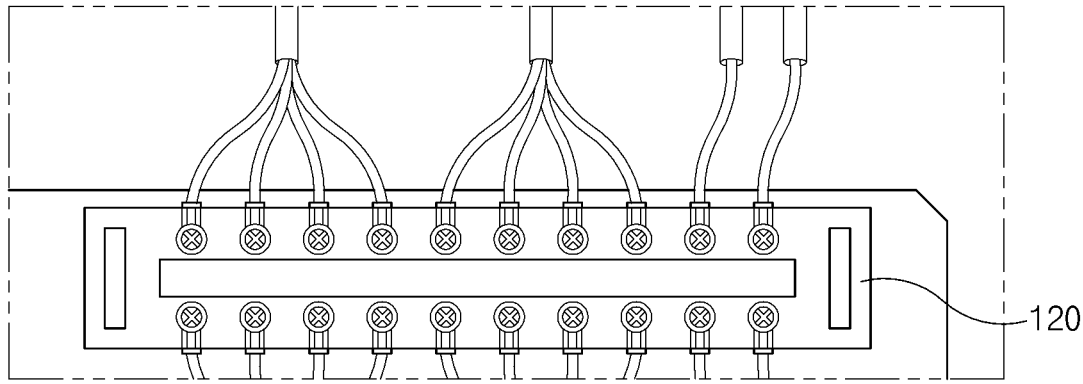
FIG. 7 is a plan view illustrating a resistance inspection unit of the device for inspecting a welded state for a cylindrical secondary battery according to the first embodiment of the present invention.
Figure 8:
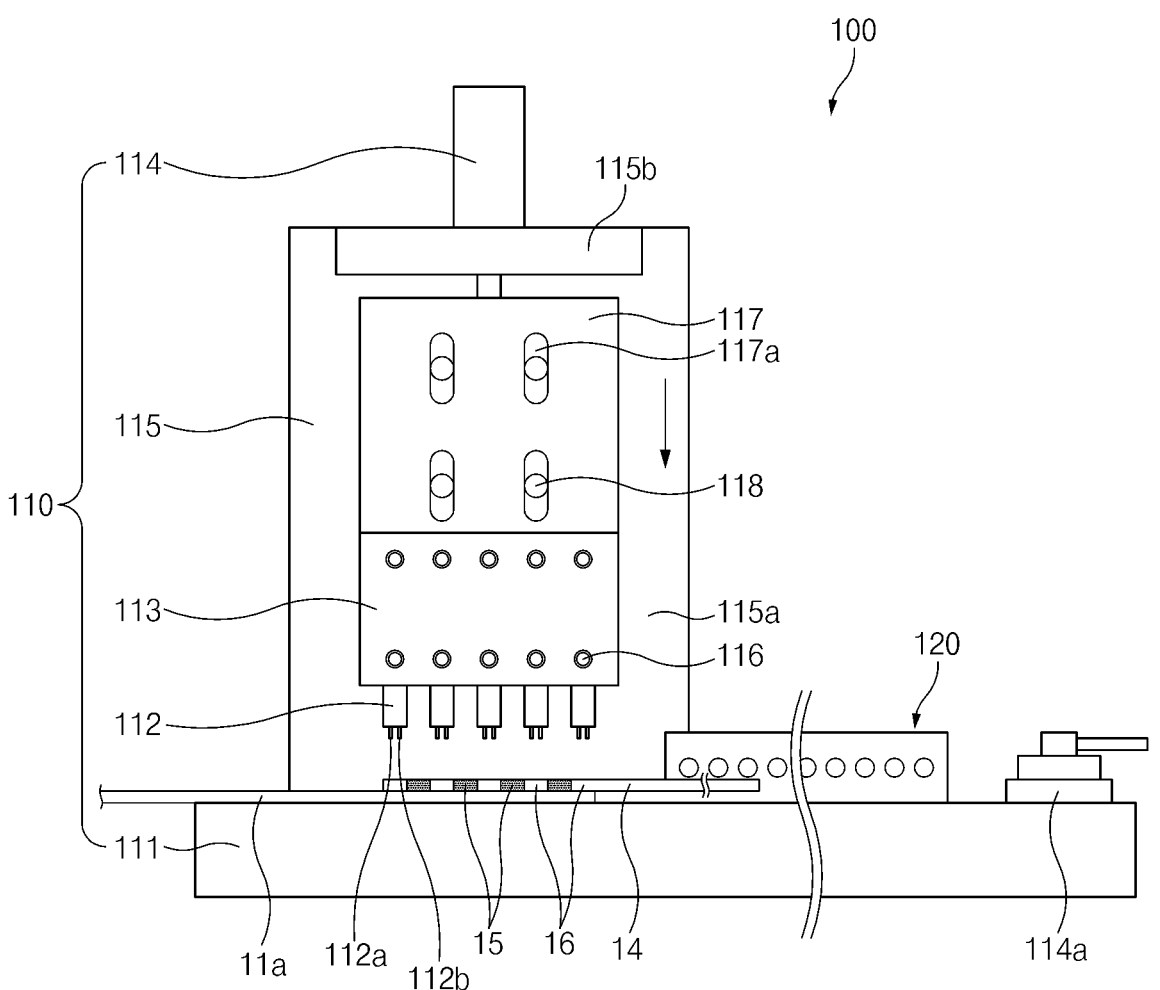
FIG. 8 is a front view illustrating a using state of the device for inspecting a welded state for a cylindrical secondary battery according to the first embodiment of the present invention.

That is, referring to FIG. 6, the plurality of resistance measurement probes 112 may respectively and accurately measure the resistance values of the plurality of welded portions 15 while being respectively in contact with the non-welding surface 16 of the electrode tab 14, which is disposed between the plurality of welded portions 15, and the non-welding surfaces 16 of the electrode tab 14, which are disposed outside the plurality of outermost welded portions 15.

As such, the plurality of resistance measurement probes 112 may respectively and accurately measure the resistance values of the plurality of welded portions 15.

For example, when the number of the plurality of welded portions 15 is two or more, the total number of the plurality of resistance measurement probes 112 is three or more. That is, when two welded portions 15 are provided, three resistance measurement probes 112 are respectively in contact with a non-welding surface 16 disposed between the two welded portions 15 and non-welding surfaces 16 disposed outside the outermost welded portions 15. In addition, when four welded portions 15 are provided, five resistance measurement probes 112 are respectively in contact with non-welding surfaces 16 disposed between the four welded portions 15 and non-welding surfaces 16 disposed outside the outermost welded portions 15.

A spring elastically supports the resistance measurement probe 112 on the non-welding surface 16. Accordingly, irrespective of unevenness of the non-welding surface 16, the resistance measurement probe 112 may be in stable contact with the non-welding surface 16.

The plurality of resistance measurement probes 112 may be in contact with the non-welding surfaces 16 disposed out of a set range, which face each other with respect to the welded portions 15. The set range may be a range spaced apart from the welded portion by about 2 mm. When the set range is about 2 mm or less, the resistance measurement probes may be in contact with the welded portions to occur a measurement error.

The plurality of resistance measurement probes 112, which are respectively in contact with the non-welding surface 16 disposed between the plurality of welded portions 15 and the non-welding surfaces 16 outside the outermost welded portions 15, may be spaced apart from each other at the same interval. Accordingly, an error of the resistance values of the plurality of welded portions 15 may be minimized.

The plurality of resistance measurement probes 112 are coupled to the coupling member 113. In particular, the coupling member 113 may allow the plurality of resistance measurement probes 112 to descend so as to be in simultaneous contact with the non-welding surfaces 16, or allow the plurality of resistance probes measurement 112 to simultaneously ascend so as to be in non-contact with the non-welding surfaces 16.

Figure 3:
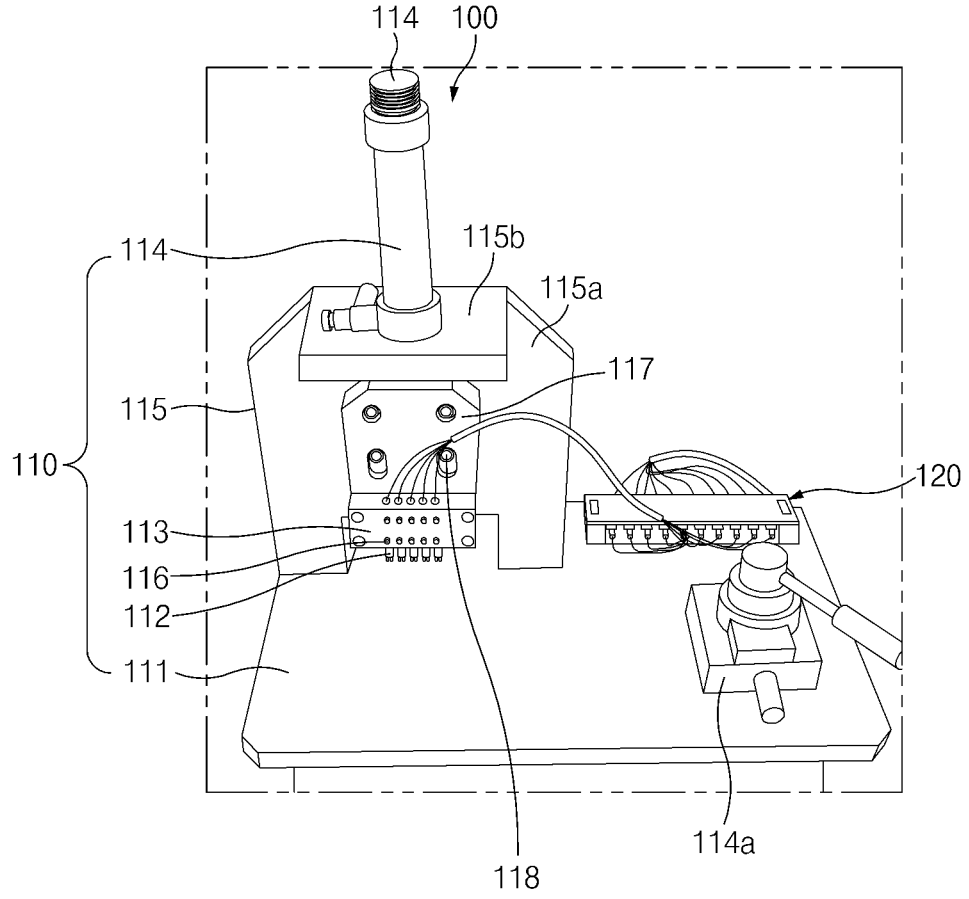
FIG. 3 is a perspective view illustrating a device for inspecting a welded state for a cylindrical secondary battery according to a first embodiment of the present invention.
Figure 4:
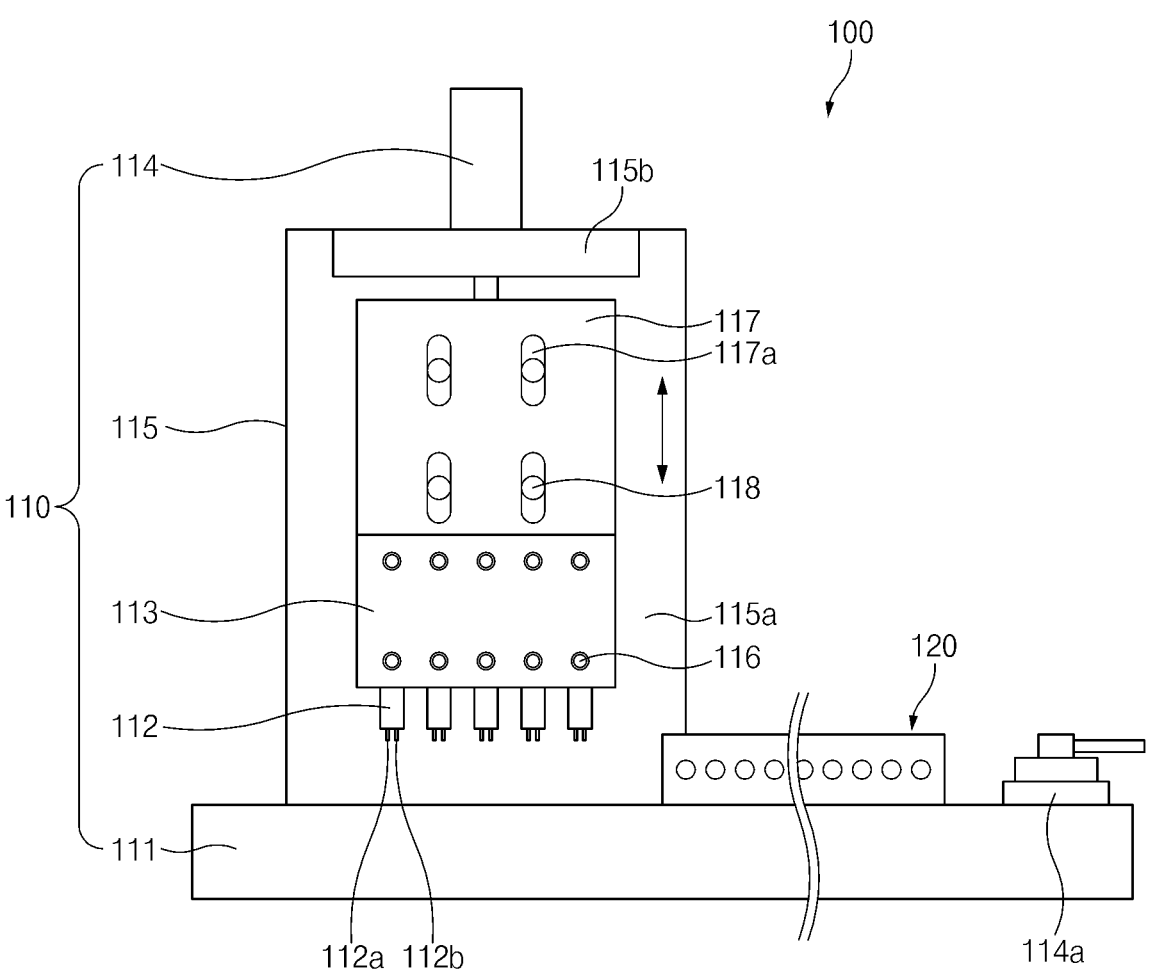
FIG. 4 is a front view of FIG. 3.
Figure 5:
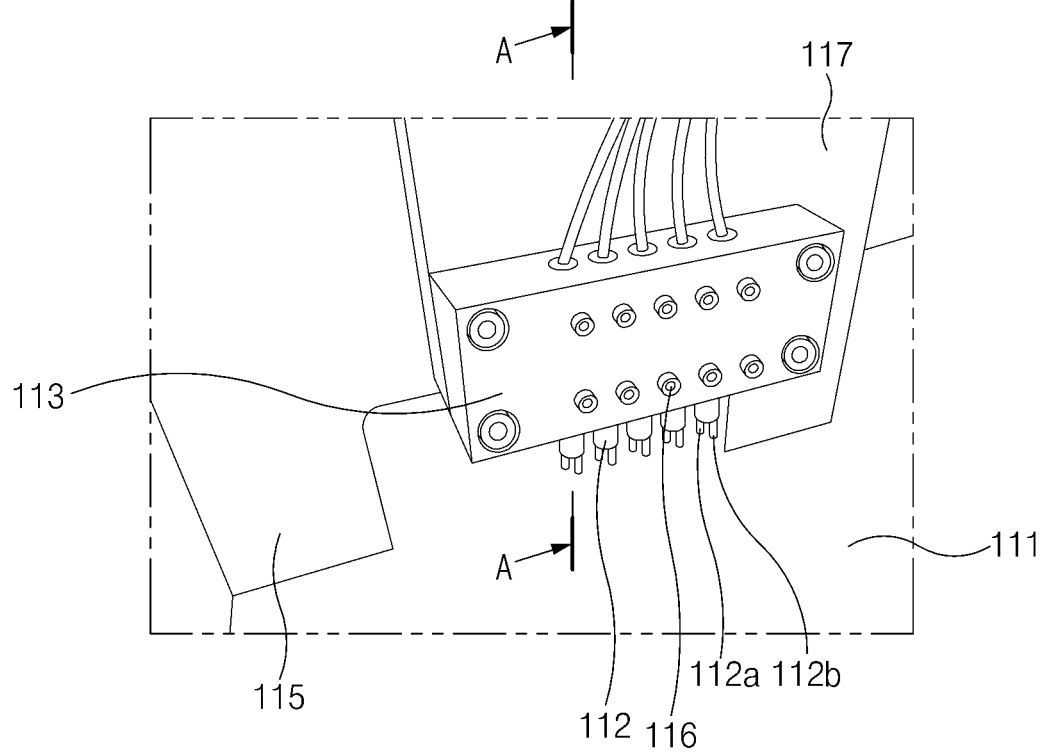
FIG. 5 is a perspective view illustrating a resistance measurement unit of the device for inspecting a welded state for a cylindrical secondary battery according to the first embodiment of the present invention.

That is, a plurality of coupling holes 113a, which are penetrated in an upward-downward direction to have the plurality of resistance measurement probes 112 inserted thereinto as seen in FIG. 3, are defined in the coupling member 113. The plurality of coupling holes are defined to be penetrated from a top surface to a bottom surface of the coupling member. Accordingly, the plurality of resistance measurement probes 112 may be easily coupled to the coupling member 113 through the plurality of coupling holes 113a.

Here, the plurality of resistance measurement probes 112 may be detachably coupled to the plurality of coupling holes. That is, the plurality of resistance measurement probes 112 may be coupled to the plurality of coupling holes and may be decoupled from the coupling holes.

In one example, the resistance measurement unit 110 further comprises a plurality of fixing bolts 116 that detachably couple the plurality of resistance measurement probes 112 to the coupling member 113. The plurality of fixing bolts 116 pass through the coupling member 113 and respectively press-fit the plurality of resistance measurement probes 112 inserted into the plurality of coupling holes. Accordingly, the plurality of resistance measurement probes 112 may be fixed so as to be immovable.

That is, when the plurality of fixing bolts 116 are tightened, the plurality of resistance measurement probes 112 may be fixed to the coupling member 113. When the fixing bolts 116 are loosened, the plurality of resistance measurement probes 112 fixed to the coupling member 113 may be decoupled.

In particular, the plurality of fixing bolts 116 may adjust the height of the plurality of resistance measurement probes 112 coupled to the coupling member 113. That is, the plurality of fixing bolts 116 may be loosened to adjust the height of the plurality of resistance measurement probes 112 inserted into the coupling member, and then the plurality of fixing bolts 116 may be tightened to fix the plurality of resistance measurement probes 112 to the coupling member 113.

In addition, the fixing bolts 116 may adjust the height of only one or more among the plurality of resistance measurement probes. Here, a fixing bolt may be used to adjust the height of a resistance measurement probe unnecessary to measure the resistance of the welded portions, so that the resistance measurement probe is in non-contact with a non-welding surface.

The fixing member 115 is provided at one side of a top surface of the seating member, on which the welding area is seated, and has a vertical surface 115a. The fixing member 115 is intended to fix the elevation member 114 to the seating member 111.

The elevation member 114 is intended to allow the coupling member 113 to ascend or descend. The elevation member 114 is fixed to a fixing piece 115b provided on an upper end of the fixing member 115 and allows the coupling member 113 to descend in a direction of the plurality of welded portions 15 so that the plurality of resistance measurement probes 112 are in simultaneous contact with the non-welding surfaces.

That is, the elevation member 114 allows the coupling member 113 to descend so that the plurality of resistance measurement probes 112 are in contact with the non-welding surfaces 16, or allows the coupling member 113 to ascend so that the plurality of resistance measurement probes 112 are in non-contact with the non-welding surfaces 16.

Here, the elevation member 114 may be a hydraulic or a pneumatic cylinder. Here, the resistance measurement unit further comprises a switch 114a that supplies or recovers a hydraulic pressure or a pneumatic pressure to or from the elevation member.

The fixing piece 115b may be provided to protrude in a direction of the vertical surface of the fixing member 115 and have a top surface to which the elevation member is coupled so that the coupling member is allowed to vertically descend by the elevation member.

The fixing piece may be provided on the upper end of the fixing member so that the position of the fixing piece is adjustable in a width direction of the fixing member (in a left and right direction as seen in FIG. 3). Accordingly, the elevation member fixed to the fixing piece may be moved in a horizontal direction, and the fixing piece may be operatively associated with the elevation member to adjust the horizontal position of the coupling member. Consequently, the positions of the resistance measurement probes coupled to the coupling member may be adjusted to correspond to the non-welding surfaces.

The coupling member 113 may be coupled to the fixing member so as to be slidably movable in a direction opposite to a direction toward the non-welding surfaces 16, i.e., so as to be slidably movable in the upward-downward direction as seen in FIG. 3. Accordingly, the resistance measurement probes 112 may be stably vertically moved toward the non-welding surfaces 16, so that the resistance measurement probes 112 may be in accurate contact with the non-welding surfaces 16.

In one example, the resistance measurement unit further comprises a guide means by which the coupling member 113 is coupled to the vertical surface of the fixing member 115 so as to be movable in a vertical direction.

The guide member comprises a guide plate 117, which has one end provided with the coupling member 113 and the other end provided with a long hole 117a elongated in the vertical direction, and a coupling bolt 118, which passes through the long hole 117a so as to be fixed to the vertical surface of the fixing member 115 and moves or fixes the coupling member 113 in the vertical direction within the long hole 117a.

The coupling member 113 may be provided to be detachable through a plurality of bolts from the guide plate 117. Accordingly, the plurality of resistance measurement probes 112 inserted into the coupling member 113 may be recovered to be stored.

In the resistance measurement unit 110 having such a configuration, the welded portions 15, which couple the electrode 11a to the electrode tab 14 of the cylindrical secondary battery 10, are seated on the seating member 111, and then the switch is turned "ON". Then, while being injected with a hydraulic pressure or a pneumatic pressure, the elevation member 114 operates. While the coupling member 113 descends toward the non-welding surfaces 16 by the operation of the elevation member 114, the resistance measurement probes 112 coupled to the coupling member 113 are in contact with the non-welding surfaces 16 disposed at both sides of the welded portions 15, respectively. Here, in the resistance measurement probe 112, a current flows through the current probe 112a, and the voltage probe 112b measures a voltage generated according to a flow of the current passing through the welded portion 15. Consequently, the resistance values of the welded portions 15 may be derived. Thereafter, when the switch 114a is turned "OFF", the coupling member 113, which has descended by means of the elevation member 114, ascends while the hydraulic pressure or pneumatic pressure injected into the elevation member 114 is recovered. While the coupling member 113 ascends, the resistance measurement probes 112 are separated from the non-welding surfaces 16.

Such processes may be repeated to perform an exhaustive inspection on the plurality of welded portions 15 comprised in the secondary battery.

Resistance Inspection Unit

The resistance inspection unit 120 inspects the weak welding by comparing the resistance values of the plurality of welded portions 15, which are measured by the resistance measurement unit 110, with the critical resistance value.

That is, the resistance inspection unit 120 determines the resistance values of the welded portions 15 from an average of data about the resistance values measured by the resistance measurement unit 110, and sets the critical resistance value in a statistical way. When the determined resistance values exceed the critical resistance value, it is determined as weak welding.

Figure 11:
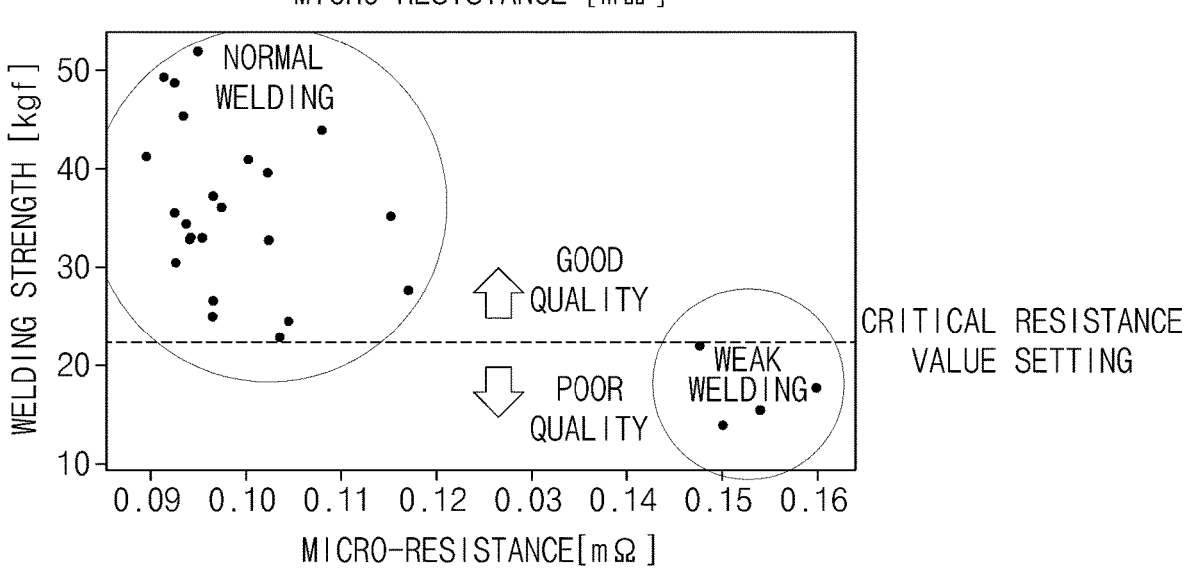
FIG. 11 is a graph showing a correlation between welding strength and resistance.

FIG. 11 is a graph illustrating welding strength and electric resistance. Referring to FIG. 11, it may be found that when measured, the electric resistance values of the welded portions 15 having low welding strength are greater than the electric resistance values of the welded portions 15 having normal welding strength. That is, it may be known that the resistance values of the welded portions 15 having normal welding strength of about 22 kgf or greater are less than the resistance values of the weakly welded portions 15 having welding strength of less than about 22 kgf.

Thus, the device 100 for inspecting a welded state for a cylindrical secondary battery according to the first embodiment of the present invention may perform an accurate inspection for weak welding on the cylindrical secondary battery 10, particularly on the plurality of welded portions 15 comprised in the cylindrical secondary battery 10.

Hereinafter, an inspection method using the device for inspecting a welded state for a cylindrical secondary battery according to the first embodiment of the present invention will be described.

[Method for Inspecting Welded State for Cylindrical Secondary Battery According to First Embodiment of Present Invention]

Figure 12:
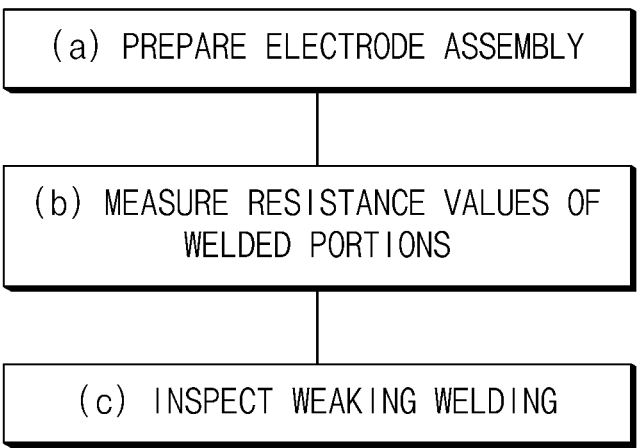
FIG. 12 is a flowchart illustrating a method for inspecting a welded state for a cylindrical secondary battery according to the first embodiment of the present invention.

As illustrated in FIG. 12, a method for inspecting a welded state for a cylindrical secondary battery according to a first embodiment of the present invention is intended to inspect a welded state on each of the plurality of welded portions 15 coupling the non-coating portion 11a-1 of the electrode 11a to the electrode tab 14, which are provided in the electrode assembly of the cylindrical secondary battery 10.

That is, the method for inspecting a welded state for a cylindrical secondary battery according to the first embodiment of the present invention comprises a process (a) of preparing the electrode assembly, a process (b) of measuring resistance of the plurality of welded portions provided in the electrode assembly, and a process (c) of inspecting the weak welding on the plurality of welded portions.

The process (a) is of preparing the electrode assembly provided with the plurality of welded portions 15 coupling the non-coating portion 11a-1 of the electrode to the electrode tab 14. The process (b) is of measuring a resistance value of each of the plurality of welded portions by using the resistance measurement unit provided with the plurality of resistance measurement probes. The process (c) is of comparing the resistance values of the plurality of welded portions, which are measured through the resistance measurement unit, with a critical resistance value, and when the resistance value of at least one welded portion among the plurality of welded portions exceeds the critical resistance value, it is determined as weak welding.

Hereinafter, the method for inspecting a welded state for a cylindrical secondary battery according to the first embodiment of the present invention will be described in detail.

Process (a)

In the process (a), the electrode assembly 11 is prepared. The electrode assembly 11 has a structure in which the electrode 11a and the separator 11b are stacked in sequence and then wound in a jelly-roll shape. Here, the electrode 11a comprises the positive electrode and the negative electrode. The positive electrode is connected to the cap assembly 13 through the positive electrode tab, and the negative electrode is connected to the can 12 through the negative electrode tab. The positive electrode tab and the negative electrode tab constitute the electrode tab 14, and the electrode tab 14 is coupled to the non-coating portion 11a-1 of the electrode 11a by welding. That is, referring to FIG. 2, the plurality of welded portions 15, and the non-welding surfaces 16 between and outside the plurality of welded portions 15, are formed in the welding area of the non-coating portion 11a-1 of the electrode 11a and the electrode tab 14.

Process (b)

In the process (b), the plurality of resistance measurement probes 112 are in contact with the non-welding surface 16 disposed between the plurality of welded portions 15 and the non-welding surfaces 16 outside the outermost welded portions 15 to measure the resistance values of the plurality of welded portions 15, respectively.

Figure 9:
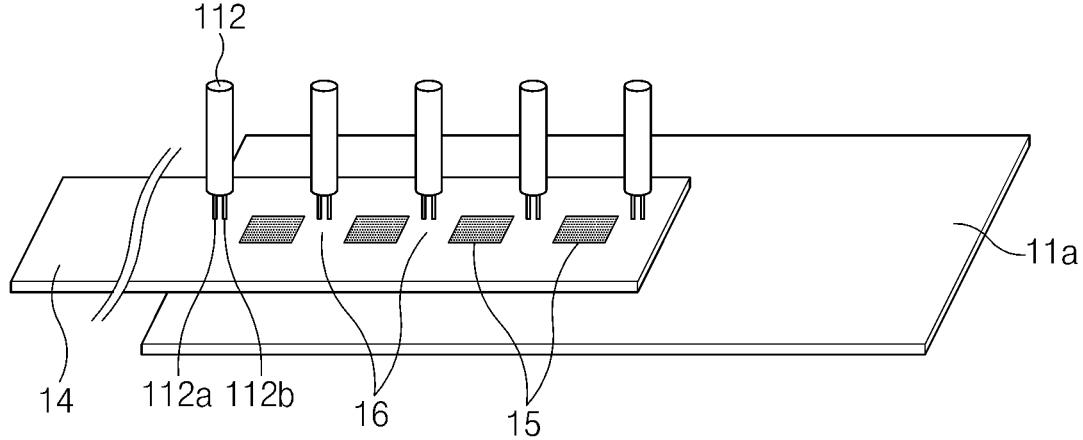
FIG. 9 is a perspective view illustrating a state in which resistance measurement probes measure resistance.

For example, referring to FIG. 9, in the process (b), when four welded portions 15 are provided, five resistance measurement probes 112 are respectively in contact with non-welding surfaces 16 disposed between the four welded portions 15 and non-welding surfaces 16 outside the outermost welded portions. Then, a four-wire resistance measurement be performed by a current probe 112a and a voltage probe of each of the resistance measurement probes 112 in contact with the non-welding surfaces 16 disposed at both sides of the welded portions 15, respectively.

More specifically, the resistance measurement unit 110 described above is used in the process (b), and the resistance measurement unit 110 comprises the seating member 111, the plurality of resistance measurement probes 112, the coupling member 113, the elevation member 114 provided with the switch 114a, and the fixing member.

That is, in the process (b), the welding area provided with the plurality of welded portions 15, at which the electrode and the electrode tab 14 of the electrode assembly 11 are coupled to each other, is seated on the seating member 111. Thereafter, the switch 114a is turned "ON". Then, while being injected with a hydraulic pressure or a pneumatic pressure, the elevation member 114 operates. While the coupling member 113 descends toward the non-welding surfaces 16 by the operation of the elevation member 114, the plurality of resistance measurement probes 112 coupled to the coupling member 113 may be in contact with the non-welding surfaces 16 disposed at both sides of the welded portions 15, respectively. Here, a current flows through the current probe 112a of each of the plurality of the resistance measurement probes 112, and the voltage probe 112b of each of the plurality of the resistance measurement probes 112 measures a voltage generated according to a flow of the current passing through each of the welded portions 15. Consequently, the resistance values of the welded portions 15 may be measured. That is, the plurality of the resistance measurement probes 112 may measure the resistance values of the welded portions 15 through the four-wire resistance measurement method. Thereafter, when the switch 114a is turned "OFF", the coupling member 113 may ascend by means of the elevation member 114 while the hydraulic pressure or pneumatic pressure injected into the elevation member 114 is recovered. While the coupling member 113 ascends, the resistance measurement probes 112 may be separated from the non-welding surfaces 16.

In one example, in the process (b), the plurality of resistance measurement probes 112 may be in contact with the non-welding surfaces 16 of the electrode tab 14, which are disposed at both sides of the welded portions 15, respectively, so as to measure the resistance of the welded portions 15.

Alternatively, in the process (b), the plurality of resistance measurement probes 112 may be in contact with the non-welding surfaces 16 of the non-coating portion, which are disposed at both sides of the welded portions 15, respectively, so as to measure the resistance of the welded portions 15.

In the process (b), the plurality of resistance measurement probes 112 may be in contact with the non-welding surfaces facing each other with respect to the welded portions. Accordingly, the voltage generated according to the flow of the current passing through the welded portion may be effectively measured.

The plurality of resistance measurement probes 112, which are in contact with the non-welding surface disposed between the plurality of welded portions and the non-welding surfaces outside the outermost welded portions, may be spaced apart from each other at the same interval. Accordingly, an error of the resistance values of the plurality of welded portions may be minimized.

Process (c)

In the process (c), the resistance values of the plurality of welded portions 15 are compared with the critical resistance value to inspect whether the weak welding occurs. That is, when a determined resistance value exceeds the critical resistance value, it is determined as weak welding.

The critical resistance value may be set to about 0.12 mΩ to about 0.60 mΩ. Preferably, the critical resistance value may be set to about 0.15 mΩ to about 0.50 mΩ. Here, the critical resistance value may be newly set according to products and environment.

Thus, the method for inspecting a welded state for a cylindrical secondary according the battery to first embodiment of the present invention may accurately inspect whether the weak welding occurs between the electrode 11a and the electrode tab 14.

Hereinafter, other embodiments of the present invention will be described using the same reference symbol for an element having the same function as the embodiment described above, and duplicate description will be omitted.

[Device for Inspecting Welded State for Cylindrical Secondary Battery According to Second Embodiment of Present Invention]

Figure 13:
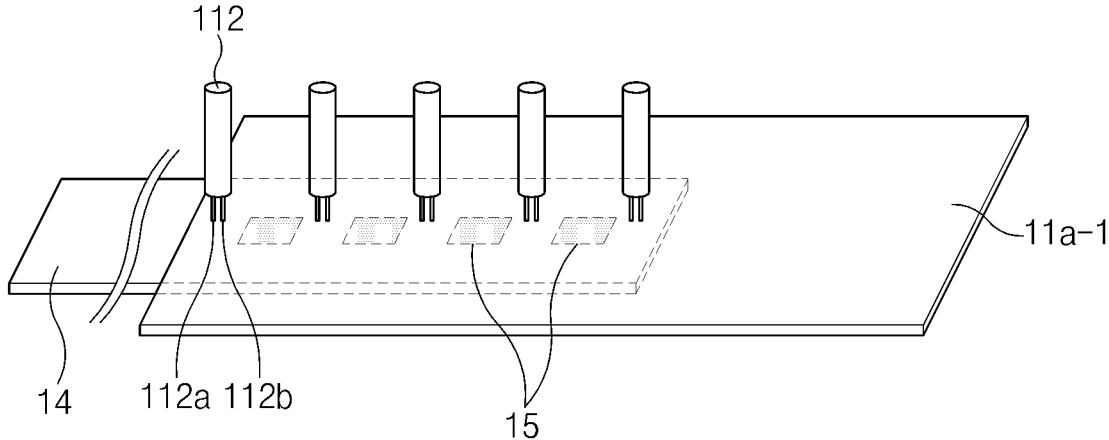
FIG. 13 is a perspective view illustrating a device for inspecting a welded state for a cylindrical secondary battery according to a second embodiment of the present invention.

As illustrated in FIG. 13, a device 100 for inspecting a welded state for a cylindrical secondary battery according to a second embodiment of the present invention comprises a plurality of resistance measurement probes 112. The plurality of resistance measurement probes 112 may measure resistance values of the welded portions 15 while being in contact with non-coating portions 11a-1 of the electrode 11a, which are the non-welding surfaces disposed at both sides of the plurality of welded portions 15, respectively.

That is, the plurality of resistance measurement probes 112 may measure the resistance values of the plurality of welded portions 15 while being in contact with the non-coating portion between the plurality of welded portions 15, and the non-coating portions outside the outermost welded portions.

[Device for Inspecting Welded State for Cylindrical Secondary Battery According to Third Embodiment of Present Invention]

Figure 14:
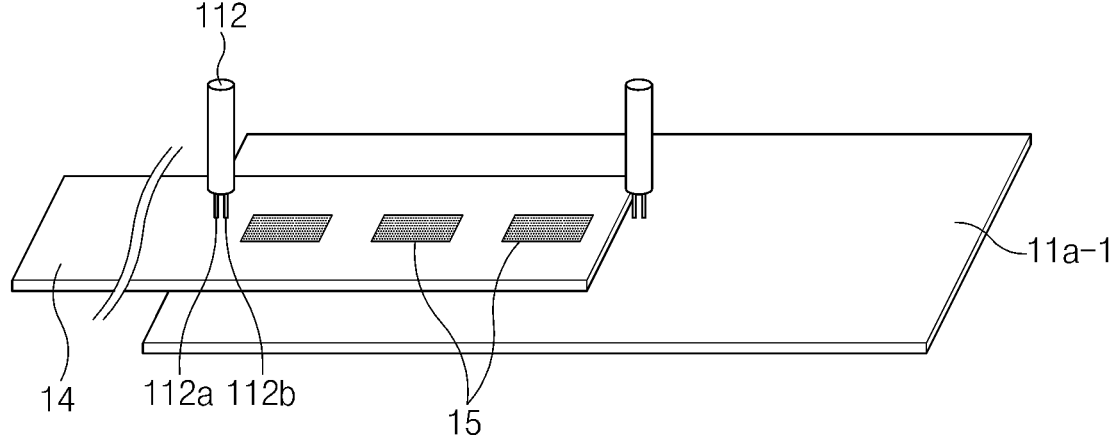
FIG. 14 is a perspective view illustrating a device for inspecting a welded state for a cylindrical secondary battery according to a third embodiment of the present invention.

As illustrated in FIG. 14, a device 100 for inspecting a welded state for a cylindrical secondary battery according to a third embodiment of the present invention comprises a plurality of resistance measurement probes 112. Referring to FIG. 14, the plurality of resistance measurement probes 112 may derive resistance values of welded portions 15 not only through the non-welding surfaces 16 of the electrode tab 14, which are disposed at both sides of the welded portions 15, but also through the non-welding surface 16 of the non-coating portion 11a-1 provided in the electrodes 11a.

Experimental Example

Preparation of Test Piece

Figure 15:
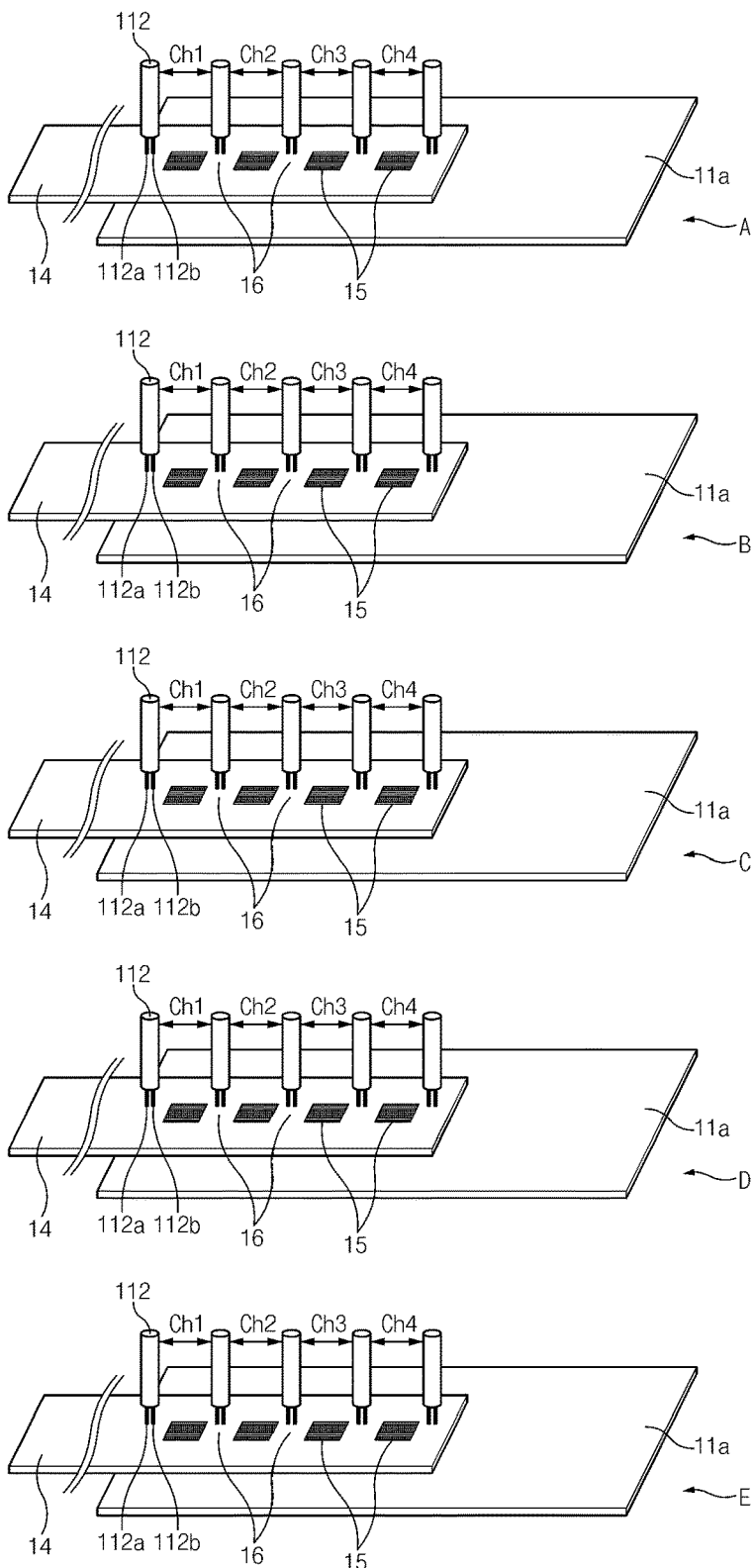
FIG. 15 is a perspective view illustrating an experimental example in which welded portions are inspected through the device for inspecting a welded state for a cylindrical secondary battery according to the first embodiment of the present invention.

As illustrated in FIG. 15, each of five test pieces is prepared for measurement of resistance values of welded portions 15 between an electrode and an electrode tab 14. That is, the five test pieces are prepared by welding five electrode tabs 14 to five electrodes, respectively, with the same welding strength and for different welding times. For ease of explanation, the five test pieces are referred to as first to fifth test pieces and denoted as reference symbols A to E.

Here, four welded portions 15 are formed in each of the five test pieces when coupling the electrode 11a to the electrode tab 14. The welding time of the first test piece A is about 0.1 s, the welding time of the second test piece B is about 0.09 s, the welding time of the third test piece C is about 0.08 s, the welding time of the fourth test piece D is about 0.07 s, and the welding time of the fifth test piece E is about 0.06 s.

Through such processes, the five test pieces may be prepared.

Measurement of Resistance Values of Test Pieces

The resistance values of the welded portions 15 formed in each of the five test pieces are measured by using the device 100 for inspecting a welded state for a cylindrical secondary battery according to the first embodiment of the present invention. That is, as illustrated in FIG. 15, in the device 100 for inspecting a welded state for a cylindrical secondary battery according to the first embodiment of the present invention, five resistance measurement probes 112 are in contact with non-welding surfaces 16 disposed at both sides of the welded portions 15, which are formed in each of the five test pieces, to measure the resistance values of the welded portions 15 through a four-wire resistance measurement method. Here, in each of the five test pieces, resistance measurement of a first welded portion 15 is referred to as "ch1", resistance measurement of a second welded portion 15 is referred to as "ch2", resistance measurement of a third welded portion 15 is referred to as "ch3", and resistance measurement of a fourth welded portion 15 is referred to as "ch4".

Result of Resistance Measurement

Figure 16:
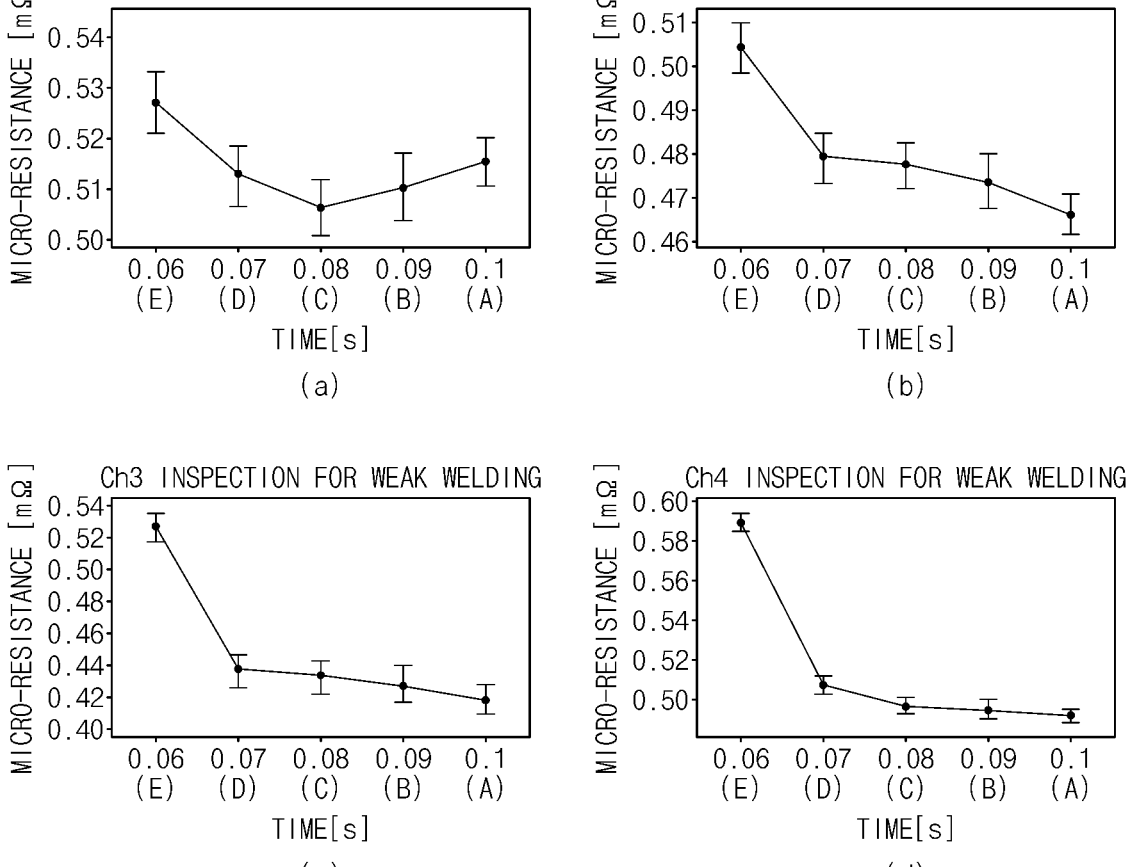
FIG. 16 is a graph showing a welded state of each of the welded portions inspected in the experimental example.

As the result of measuring the resistance values of the four welded portions 15 formed in each of the five test pieces, graphs as in FIG. 16 may be obtained. Here, a critical resistance value is set to about 0.5 (mΩ).

As the result of measuring the resistance of the welded portion 15, which is disposed in "ch1", provided in each of the five test pieces, a graph as in FIG. 16 (a) may be obtained. Referring to FIG. 16 (a), it may be confirmed that each of the first to fourth test pieces does not exceed the critical resistance value and thus does not correspond to the weakly welded state, and the fifth test piece exceeds the critical resistance value and thus corresponds to the weakly welded state.

As the result of measuring the resistance of the welded portion 15, which is disposed in "ch2", provided in each of the five test pieces, a graph as in FIG. 16 (b) may be obtained. Referring to FIG. 16 (b), it may be confirmed that each of the first to fourth test pieces does not exceed the critical resistance value and thus does not correspond to the weakly welded state, and the fifth test piece exceeds the critical resistance value and thus corresponds to the weakly welded state.

As the result of measuring the resistance of the welded portion 15, which is disposed in "ch3", provided in each of the five test pieces, a graph as in FIG. 16 (c) may be obtained. Referring to FIG. 16 (c), it be confirmed that each of the first to fourth test pieces does not exceed the critical resistance value and thus does not correspond to the weakly welded state, and the fifth test piece exceeds the critical resistance value and thus corresponds to the weakly welded state.

As the result of measuring the resistance of the welded portion 15, which is disposed in "ch4", provided in each of the five test pieces, a graph as in FIG. 16 (d) may be obtained. Referring to FIG. 16 (d), it may be confirmed that each of the first to third test pieces does not exceed the critical resistance value and thus does not correspond to the weakly welded state, and each of the fourth and fifth test pieces exceeds the critical resistance value and thus corresponds to the weakly welded state.

Therefore, the exhaustive inspection for the welded state may be easily performed on the welded portions coupling the electrode to the electrode tab, and the weakly welded state may be accurately determined.

The scope of the present invention is defined by the appended claims rather than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

10: Cylindrical secondary battery
11: Electrode assembly

11*a*: Electrode
11*a*-1: Non-coating portion
11*b*: Separator
12: Can
13: Cap assembly
14: Electrode tab
15: Welded portion
16: Non-welding surface
100: Device for inspecting welded state
110: Resistance measurement unit
111: Seating member
112: Resistance measurement probe
112*a*: Current probe
112*b*: Voltage probe
113: Coupling member
113*a*: Coupling hole
114: Elevation member
114*a*: Switch
115: Fixing member
115*a*: Vertical surface
115*b*: Fixing piece
116: Fixing bolt
117: Guide plate
117*a*: Long hole
118: Coupling bolt
120: Resistance inspection unit

The invention claimed is:

1. A device for inspecting a welded state for a plurality of welded portions coupling a non-coating portion of an electrode to an electrode tab, the device comprising:

a resistance measurer having a plurality of resistance measurement probes configured to respectively measure resistance values of the plurality of welded portions; and a resistance inspector configured to compare each of the resistance values of the plurality of welded portions, which are measured by the resistance measurer, with a critical resistance value, wherein, when the resistance value of at least one welded portion among the plurality of welded portions exceeds the critical resistance value, the at least one welded portion is determined as having a weak welding, wherein the plurality of resistance measurement probes respectively measure the resistance values of the plurality of welded portions while being respectively in contact with a non-welding surface disposed between the plurality of welded portions and non-welding surfaces outside outermost welded portions of the plurality of welded portions, and wherein the resistance measurer comprises:

a seating member configured to support a welding area provided with the plurality of welded portions at which the non-coating portion of the electrode and the electrode tab are coupled to each other;

a fixing member disposed at one side of a top surface of the seating member, the fixing member having a vertical surface and a fixing piece extending from an upper end of the vertical surface;

a coupling member disposed on the vertical surface of the fixing member, the coupling member being coupled to the plurality of resistance measurement probes, the coupling member being configured to arrange the plurality of resistance measurement probes to be in simultaneous contact with the non-welding surface disposed between the plurality of welded portions and the non-welding surfaces outside the outermost welded portions; and an elevation member fixed to the fixing piece, the elevation member being configured to cause the coupling member to descend in a direction of the plurality of welded portions so that the plurality of resistance measurement probes are in simultaneous contact with the non-welding surfaces.

2. The device of claim 1, wherein the plurality of resistance measurement probes are in contact with the non-welding surfaces facing each other with respect to the welded portions.

3. The device of claim 2, wherein the non-welding surfaces are non-welding surfaces of the electrode tab or non-welding surfaces of the non-coating portion, which are disposed at opposite sides of the welded portions, respectively.

4. The device of claim 2, wherein the plurality of resistance measurement probes, which are respectively in contact with the non-welding surface disposed between the plurality of welded portions and the non-welding surfaces outside the outermost welded portions, are spaced apart from each other at the same interval.

5. The device of claim 1, wherein each of the plurality of resistance measurement probes comprises a current probe and a voltage probe that are paired.

6. The device of claim 1, wherein the coupling member includes a plurality of coupling holes to receive the plurality of resistance measurement probes therein, the coupling holes penetrating from a top surface to a bottom surface of the coupling member, and wherein the resistance measurer further comprises a plurality of fixing bolts configured to press-fit and fix the plurality of resistance measurement probes which pass through the coupling member in the plurality of coupling holes, respectively.

7. The device of claim 6, wherein the elevation member is a hydraulic cylinder or a pneumatic cylinder, and wherein the resistance measurer further comprises a switch configured to supply a hydraulic pressure or a pneumatic pressure to operate the elevation member.

8. The device of claim 1, further comprising:

a guide plate having a first end having the coupling member and a second end having a long hole elongated in the vertical direction; and a coupling bolt passing through the long hole and fixed to the vertical surface of the fixing member to guide movement of the coupling member in the vertical direction.

9. The device of claim 8, wherein the coupling member is detachable from the guide plate.

10. A method for inspecting a welded state for a cylindrical secondary battery, the method comprising:

preparing an electrode assembly comprising a plurality of welded portions coupling a non-coating portion of an electrode to an electrode tab;

measuring a resistance value of each of the plurality of welded portions by using a resistance measurer having a plurality of resistance measurement probes; and comparing the resistance values of the plurality of welded portions, which are measured through the resistance measurer, with a critical resistance value, wherein, when the resistance value of at least one welded portion among the plurality of welded portions exceeds the critical resistance value, the at least one welded portion is determined to have a weak welding, wherein, in the measuring the resistance value of each of the plurality of welded portions, the plurality of resistance measurement probes are in contact with a non-welding surface disposed between the plurality of welded portions, and non-welding surfaces outside outermost welded portions of the plurality of welded portions to measure the resistance values of the plurality of welded portions, respectively, and wherein the resistance measurer comprises:

a seating member configured to support a welding area provided with the plurality of welded portions at which the non-coating portion of the electrode and the electrode tab are coupled to each other;

a fixing member disposed at one side of a top surface of the seating member, the fixing member having a vertical surface and a fixing piece extending from an upper end of the vertical surface;

a coupling member disposed on the vertical surface of the fixing member, the coupling member being coupled to the plurality of resistance measurement probes, the coupling member being configured to arrange the plurality of resistance measurement probes to be in simultaneous contact with the non-welding surface disposed between the plurality of welded portions and the non-welding surfaces outside the outermost welded portions; and an elevation member fixed to the fixing piece, the elevation member being configured to cause the coupling member to descend in a direction of the plurality of welded portions so that the plurality of resistance measurement probes are in simultaneous contact with the non-welding surfaces.

11. The method of claim 10, wherein, in the measuring the resistance value of each of the plurality of welded portions, the plurality of resistance measurement probes are in contact with the non-welding surfaces facing each other with respect to the welded portions.

12. The method of claim 11, wherein, in the measuring the resistance value of each of the plurality of welded portions, the non-welding surfaces are non- welding surfaces of the electrode tab or non-welding surfaces of the non-coating portion, which are disposed at opposite sides of the welded portions, respectively.

13. The method of claim 10, wherein the plurality of resistance measurement probes, which are in contact with the non-welding surface disposed between the plurality of welded portions and the non-welding surfaces outside the outermost welded portions, are spaced apart from each other at a same interval.

14. The method of claim 10, wherein, in the measuring the resistance value of each of the plurality of welded portions, the plurality of resistance measurement probes measure the resistances of the welded portions using a four-wire resistance measurement method.

15. The method of claim 10, wherein the critical resistance value is set to about 0.12 m$\Omega$ to about 0.60 m$\Omega$.

* * * * *